(12) United States Patent
Finer

(10) Patent No.: US 8,139,499 B2
(45) Date of Patent: Mar. 20, 2012

(54) METHOD AND ARRANGEMENT FOR DETERMINING TRANSMISSION DELAY DIFFERENCES

(75) Inventor: Sami Finer, Espoo (FI)

(73) Assignee: Tellabs Oy, Espoo (FI)

( * ) Notice: Subject to any disclaimer, the term of this patent is extended or adjusted under 35 U.S.C. 154(b) by 0 days.

(21) Appl. No.: 13/052,656

(22) Filed: Mar. 21, 2011

(65) Prior Publication Data

US 2011/0170445 A1   Jul. 14, 2011

Related U.S. Application Data

(62) Division of application No. 12/361,065, filed on Jan. 28, 2009, now Pat. No. 8,027,269.

(30) Foreign Application Priority Data

Jan. 29, 2008   (FI) .................................. 20080066

(51) Int. Cl.
*G01R 31/08* (2006.01)
(52) U.S. Cl. ...................................... 370/252
(58) Field of Classification Search .......... 370/241–248, 370/250–252
See application file for complete search history.

(56) References Cited

U.S. PATENT DOCUMENTS

| 6,715,005 | B1 | 3/2004 | Rodriguez et al. |
| 2002/0071391 | A1 | 6/2002 | Ishioka |
| 2005/0165985 | A1 | 7/2005 | Vangal et al. |
| 2007/0064604 | A1 | 3/2007 | Chen et al. |
| 2009/0190490 | A1 | 7/2009 | Finer |

FOREIGN PATENT DOCUMENTS

| EP | 1 605 641 A1 | 12/2005 |
| WO | WO 01/39434 A2 | 5/2001 |
| WO | WO 01/91375 A2 | 11/2001 |
| WO | WO 02/084920 A2 | 10/2002 |
| WO | WO 2006/105042 A2 | 10/2006 |
| WO | WO 2007/082049 | 7/2007 |

OTHER PUBLICATIONS

Finnish Search Report dated May 7, 2009.
Abstract of FI20080066, which corresponds to US 2009/0190490.
Extended European Search Report dated Jun. 17, 2009.

*Primary Examiner* — Kwang B Yao
*Assistant Examiner* — Tung Q Tran
(74) *Attorney, Agent, or Firm* — Young & Thompson

(57) ABSTRACT

The invention relates to determining mutual differences of transmission delays experienced by protocol data units transmitted in a communications network. This invention is based on a surprising discovery that the time difference between the receiving moments of protocol data units the temporal receiving order of which deviates from their temporal transmitting order represents the smallest possible difference between the transmission delays experienced by these protocol data units. In a method according to the invention it is determined, based on an order indicator associated with a protocol data unit received at an earlier point of time and an order indicator associated with a protocol data unit received at a later point of time, whether the mutual order of the protocol data units changed during transmission. If the mutual order has changed, the time difference between the receiving moments of the protocol data units is calculated, which time difference represents the smallest possible difference between the transmission delays experienced by these protocol data units.

15 Claims, 4 Drawing Sheets

METHOD AND ARRANGEMENT FOR DETERMINING TRANSMISSION DELAY DIFFERENCES

CROSS REFERENCE TO RELATED APPLICATIONS

This application is a new division of co-pending application Ser. No. 12/361,065 filed on Jan. 28, 2009, which claims priority to Finnish Application No. 20080066 filed on Jan. 29, 2008. The entire contents of each of the above-identified applications are hereby incorporated by reference.

FIELD OF THE INVENTION

The invention relates to determining the mutual differences of transmission delays experienced by protocol data units. The invention concerns a method and an arrangement for determining the mutual differences of transmission delays experienced by protocol data units received. The invention further concerns a network element and a computer program.

BACKGROUND OF THE INVENTION

In many telecommunications applications it is advantageous or even necessary that the mutual differences of the transmission delays of protocol data units belonging to a communications stream remain within acceptable limits. Such protocol data units may be e.g. IP (Internet Protocol) packets, ATM (Asynchronous Transfer Mode) cells, Ethernet units, or Frame Relay units. Said communications stream is typically comprised of protocol data units transmitted consecutively in time. For example, in a situation where the communications stream is carrying a voice and/or video signal, variation in the transmission delay will increase the need for buffering the data packets received at the receiving network element such as a router, for instance. Buffering will increase the total delay experienced by said communications stream while it should be as small as possible. In connectionless communications systems, different data protocol units of the communications stream may travel through different routes on their way from the source network element to the destination network element. This means that differing transmission delays experienced by the various data protocol units may result in changing the mutual temporal order between the data protocol units, ie. the receiving order of the data protocol units deviates from the temporal order of transmission of the protocol data units in question. Also, in connection-based communications systems, the communications stream is often directed to travel along two or more parallel routes, e.g. for the reason of exercising load balancing between the different parts of the communications network. Changes in the mutual temporal order of the data protocol units will increase the need for buffering the data protocol units received.

The mutual differences of the transmission delays experienced by the data protocol units should be somehow determined so that it is possible to take corrective action as needed. Said corrective action may consist of, for example, configuring the routing protocol in such a way that parts or areas of the communications network which cause a lot of transmission delay are replaced by other parts or areas of the communications network, and/or the quality classification of parts or areas of the communications network which cause a lot of transmission delay is downgraded in order for a quality classification aware routing protocol to be able to avoid using those parts or areas.

In a prior-art method, a quantity indicating the variation in the transmission delay is calculated based on the transmission and reception times of the protocol data units. To illustrate the method, let us examine two data protocol units PDU1 and PDU2. Protocol data unit PDU1 has been sent from the source network element at moment $t\_tx1$, and protocol data unit PDU2 has been sent at $t\_tx2$. Protocol data unit PDU1 was received in the destination network element at moment $t\_rx1$, and protocol data unit PDU2 was received at $t\_rx2$. The transmission delay experienced by protocol data unit PDU1 is $d1=t\_rx1-t\_tx1$, and the transmission delay experienced by protocol data unit PDU2 is $d2=t\_rx2-t\_tx2$. The quantity indicating the difference between the two transmission delays is the difference $d1-d2=(t\_rx1-t\_tx1)-(t\_rx2-t\_tx2)=(t\_rx1-t\_rx2)-(t\_tx1-t\_tx2)$. The latter of the expressions representing the difference of the transmission delays shows that the clocks in the source network element and destination network element need not have a common time, but it suffices that said clocks are mutually frequency-locked, ie. are running at the same rate. In addition to the prerequisite concerning the frequency lock between the clocks the method also requires that the quantity indicating the transmission moment of each protocol data unit is transmitted to the destination network element. In many communications applications, however, these demands are not met.

SUMMARY

The invention is directed at an arrangement for determining the mutual differences of transmission delays experienced by protocol data units received and for performing control actions related to ingress ports of a network element. Each protocol data unit is associated with an order indicator arranged to indicate the position of the protocol data unit in the mutual sequential order of said protocol data units. A given protocol data unit is transmitted earlier than or simultaneously with the protocol data unit next in said sequential order. The order indicator need not be a piece of information indicating the transmitting moment of a protocol data unit, but it suffices that said order indicator is, for example, an ordinal number attached to the protocol data unit, or a letter of the alphabet complying with the alphabetical order, or some other piece of information which indicates the position of the protocol data unit in said sequential order. An arrangement according to the invention has a processor unit arranged to:

determine, based on a first order indicator associated with a first protocol data unit received earlier and a second order indicator associated with a second protocol data unit received later, whether the first protocol data unit is later in said sequential order than said second protocol data unit, said first protocol data unit being a protocol data unit received at a first ingress port of the network element, and said second protocol data unit being a protocol data unit received at a second ingress port of said network element, in response to a situation in which said first protocol data unit is later in said sequential order than said second protocol data unit, calculate the time difference of the receiving moments of said second protocol data unit and said first protocol data unit, said time difference representing a lower limit for a difference between the transmission delays experienced by said second protocol data unit and said first protocol data unit, and downgrade a quality classification associated with said second ingress port and used by a quality classification aware routing protocol in response to a situation where said first protocol data unit is later in said sequential order than said second protocol data unit and an indicator value updated on the basis of said time difference exceeds a predetermined threshold value.

The invention is also directed to a network element comprising a first ingress port and a second ingress port for receiving protocol data units. Each protocol data unit is associated with an order indicator arranged to indicate the position of the protocol data unit in the mutual sequential order of said protocol data units, and each protocol data unit is sent earlier than or simultaneously with the protocol data unit next in said sequential order. A network element according to the invention has a processor unit arranged to:
- determine, based on a first order indicator associated with a first protocol data unit received earlier and a second order indicator associated with a second protocol data unit received later, whether the first protocol data unit is later in said sequential order than said second protocol data unit, said first protocol data unit being a protocol data unit received at the first ingress port of the network element, and said second protocol data unit being a protocol data unit received at the second ingress port of the network element,
- in response to a situation in which said first protocol data unit is later in said sequential order than said second protocol data unit, calculate the time difference of the receiving moments of said second protocol data unit and said first protocol data unit, said time difference representing a lower limit for a difference between the transmission delays experienced by said second protocol data unit and said first protocol data unit, and
- downgrade a quality classification associated with said second ingress port and used by a quality classification aware routing protocol in response to a situation where said first protocol data unit is later in said sequential order than said second protocol data unit and an indicator value updated on the basis of said time difference exceeds a predetermined threshold value.

The invention is also directed to a method for determining the mutual differences of transmission delays experienced by protocol data units received and for performing control actions related to ingress ports of a network element. Each protocol data unit is associated with an order indicator arranged to indicate the position of the protocol data unit in the mutual sequential order of said protocol data units, and each protocol data unit is sent earlier than or simultaneously with the protocol data unit next in said sequential order. In a method according to the invention:
- it is determined, based on a first order indicator associated with a first protocol data unit received earlier and a second order indicator associated with a second protocol data unit receiver later, whether the first protocol data unit is later in said sequential order than said second protocol data unit, said first protocol data unit being a protocol data unit received at a first ingress port of the network element and said second protocol data unit is a protocol data unit received at a second ingress port of the network element,
- in response to a situation in which said first protocol data unit is later in said sequential order than said second protocol data unit, it is calculated the time difference of the receiving moments of said second protocol data unit and said first protocol data unit, said time difference representing a lower limit for a possible difference between the transmission delays experienced by said second protocol data unit and said first protocol data unit, and
- a quality classification associated with said second ingress port and used by a quality classification aware routing protocol is downgraded in response to a situation where said first protocol data unit is later in said sequential order than said second protocol data unit and an indicator value updated on the basis of said time difference exceeds a predetermined threshold value.

The invention is also directed to a computer program for controlling a programmable processor to determine the mutual differences of the transmission delays experienced by protocol data units received and to perform control actions related to ingress ports of a network element, wherein each protocol data unit is associated with an order indicator arranged to indicate the position of the protocol data unit in the mutual sequential order of said protocol data units, and each protocol data unit is sent earlier than or simultaneously with the protocol data unit next in said sequential order. A computer program according to the invention has:
- software means for controlling said programmable processor to determine, based on a first order indicator associated with a first protocol data unit received earlier and a second order indicator associated with a second protocol data unit received later, whether said first protocol data unit is later in said sequential order than said second protocol data unit, said first protocol data unit being a protocol data unit received at a first ingress port of the network element to be controlled, and said second protocol data unit being a protocol data unit received at a second ingress port of the network element,
- software means for controlling said programmable processor to calculate, in response to a situation in which said first protocol data unit is later in said sequential order than said second protocol data unit, the time difference of the receiving moments of said second protocol data unit and said first protocol data unit, said time difference representing the smallest possible difference between the transmission delays experienced by said second protocol data unit and said first protocol data unit, and
- software means for controlling said programmable processor to downgrade a quality classification associated with said second ingress port and used by a quality classification aware routing protocol in response to a situation where said first protocol data unit is later in said sequential order than said second protocol data unit and an indicator value updated on the basis of said time difference exceeds a predetermined threshold value.

The various embodiments of the invention are characterized by that which is specified in the dependent claims.

Embodiments of the invention provide an advantage over the prior-art solution described in this document, which advantage means that the clock in the destination network element need not be frequency-locked with the clock in the source network element and, furthermore, there is no need to transmit information indicating the transmitting moment of each protocol data unit to the destination network element. If the information indicating the transmitting moment is available to the destination network element it can used as an order indicator attached to the protocol data unit.

BRIEF DESCRIPTION OF THE FIGURES

Embodiments of the invention and their advantages will now be described in closer detail with reference to the embodiments presented by way of example and to the accompanying Figures where.

DESCRIPTION OF EMBODIMENTS OF INVENTION

Figure 1:
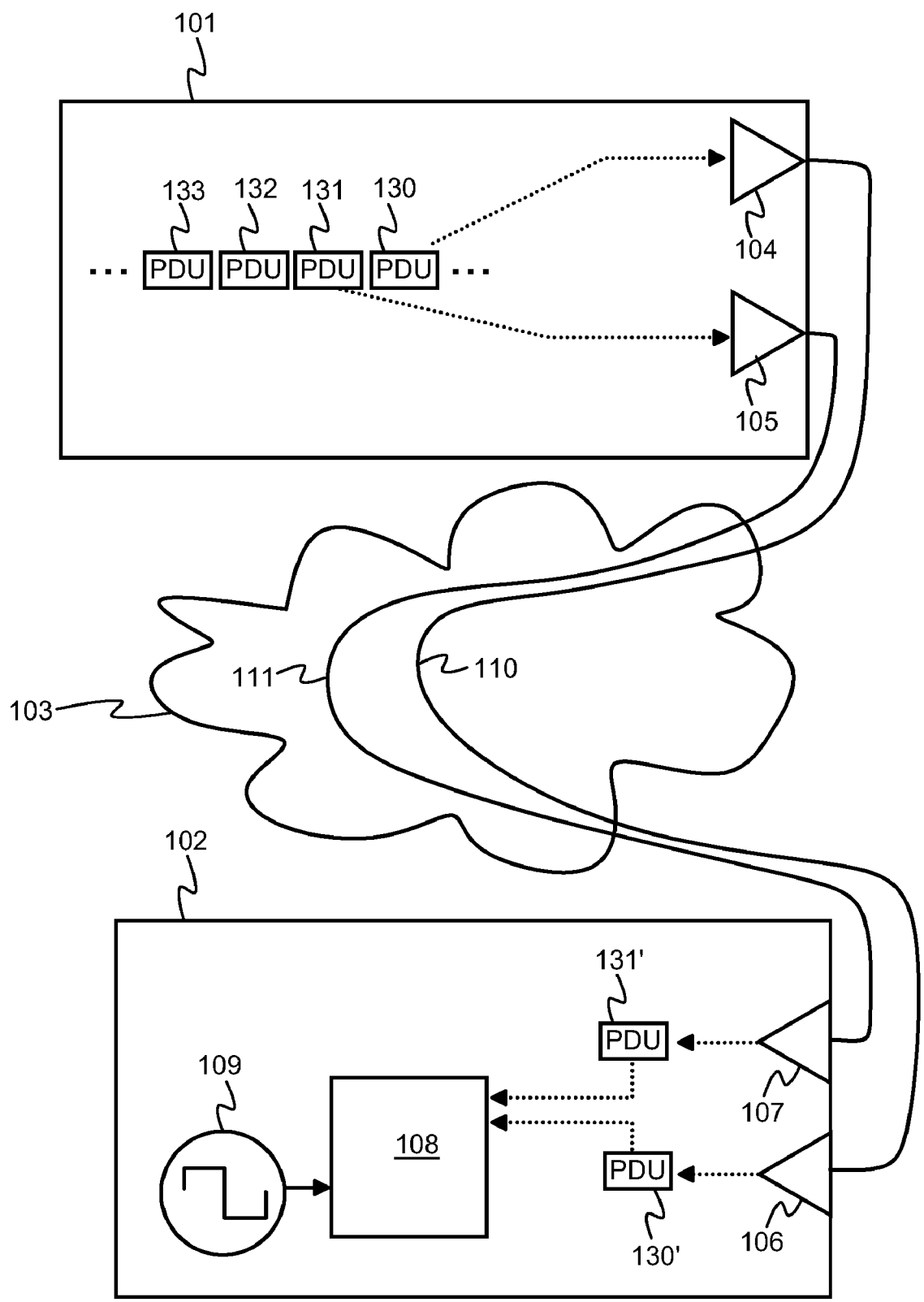
FIG. 1 illustrates in block diagram a telecommunications system employing an arrangement according to an embodiment of the invention for determining the mutual differences of transmission delays experienced by protocol data units received.
Figure 2:
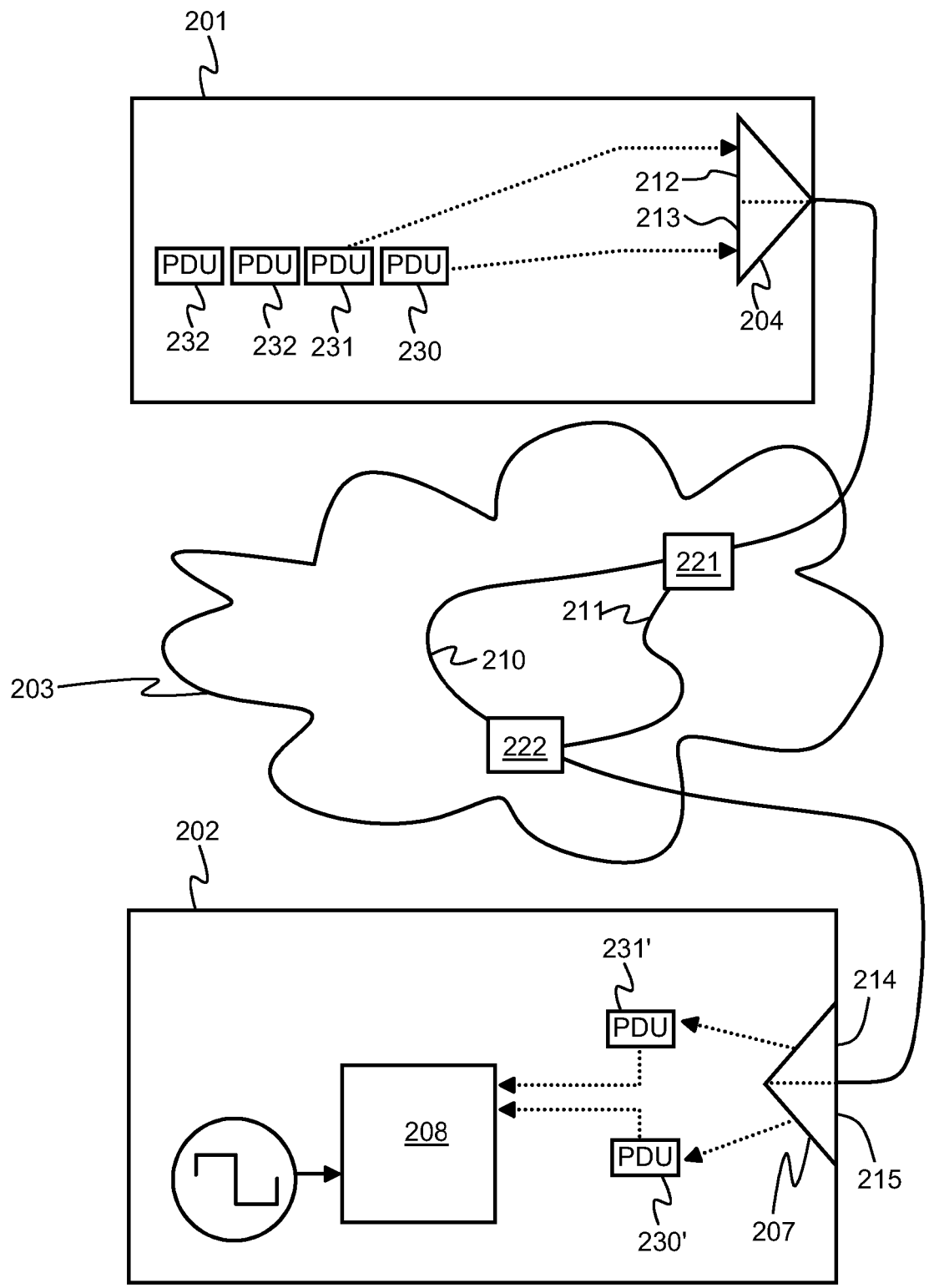
FIG. 2 illustrates in block diagram a telecommunications system employing an arrangement according to an embodiment of the invention for determining the mutual differences of transmission delays experienced by protocol data units received.

FIG. 1 illustrates in block diagram a telecommunications system employing an arrangement according to an embodiment of the invention for determining the mutual differences of transmission delays experienced by protocol data units received. Protocol data units 130, 131, 132, 133, . . . belonging to a communications stream are transmitted from a source network element 101 to a destination network element 102 via a communications network 103. The protocol data units are transmitted using two parallel routes 110 and 111 such that protocol data unit 130, for example, is sent through egress port 104 onto route 110 and protocol data unit 131, for example, is sent through egress port 105 onto route 111. Protocol data unit 130 is received at ingress port 106 of the destination network element 102, and protocol data unit 131 is received at ingress port 107 of the destination network element. In the communications system illustrated in FIG. 1, egress ports 104 and 105 as well as ingress ports 106 and 107 are depicted as physical ports. FIG. 2 shows an example using logical ports. Protocol data unit 130' represents protocol data unit 130 after protocol data unit 130 has been transmitted from the source network element 101 to the destination network element 102. Similarly, protocol data unit 131' represents protocol data unit 131 after protocol data unit 131 has been transmitted from the source network element 101 to the destination network element 102. The protocol data units may be e.g. IP (Internet Protocol) packets, ATM (Asynchronous Transfer Mode) cells, Ethernet units, or Frame Relay units.

Each protocol data unit 130, 131, 132, 133, . . . is associated with an order indicator arranged to indicate the position of the protocol data unit in the mutual sequential order of said protocol data units. The order indicator may be e.g. a transmission time stamp, which indicates the transmitting moment of the protocol data unit, ordinal number of the protocol data unit, or some other symbol attached to the protocol data unit, which symbol follows a predetermined order, such as a letter of the alphabet following the alphabetical order. The order indicator enables the destination network element to reconstruct the original sequential order of the protocol data units even if the temporal receiving order of the protocol data units were not the same as the original sequential order. A given protocol data unit in the source network element is transmitted earlier than or simultaneously with the protocol data unit next in said sequential order. In the example depicted in FIG. 1, protocol data unit 131 is after protocol data unit 130 in said sequential order. Protocol data units 130 and 131 in the source network element 101 are transferred to the egress ports 104 and 105 either substantially simultaneously or in such a manner that protocol data unit 130 is taken to egress port 104 earlier than protocol data unit 131 to egress port 105.

The arrangement for determining the mutual differences of transmission delays experienced by received protocol data units employs a processor unit 108 arranged to:

determine, based on a first order indicator associated with a first protocol data unit received earlier and a second order indicator associated with a second protocol data unit received later, whether the first protocol data unit is later in said sequential order than said second protocol data unit, and in response to a situation in which said first protocol data unit is later in said sequential order than said second protocol data unit, calculate the time difference of the receiving moments of said second protocol data unit and said first protocol data unit.

Said time difference represents the smallest possible difference between the transmission delays experienced by said second protocol data unit and said first protocol data unit.

To illustrate the operation of the arrangement let us consider an exemplary situation in which protocol data unit 131' has been received earlier than protocol data unit 130'. On the other hand, in the sequential order of protocol data units, protocol data unit 131' is later than protocol data unit 130', as indicated by the order indicators. So we have a situation in which a first protocol data unit (131') received earlier is later in the sequential order than a second protocol data unit (130') received later. Without limiting the generality we can assume that:

transmitting moment of protocol data unit 130' (130) from the source network element 101 is t_tx1, transmitting moment of protocol data unit 131' (131) from the source network element 101 is t_tx2, receiving moment of protocol data unit 130' (130) at the destination network element 102 is t_rx1, and receiving moment of protocol data unit 131' (131) at the destination network element 102 is t_rx2.

Since it is assumed that protocol data unit 131' is received earlier than protocol data unit 130, t_rx1>t_rx2. Furthermore, t_tx2≧t_tx1, because in the sequential order of protocol data units, protocol data unit 131' is later than protocol data unit 130'. The transmission delay experienced by protocol data unit 130' is d1=t_rx1−t_tx1, and the transmission delay experienced by protocol data unit 131' is d2=t_rx2−t_tx2. The quantity indicating the difference between the two transmission delays d1 and d2 is the difference of said transmission delays:

$$d1-d2=(t\_rx1-t\_tx1)-(t\_rx2-t\_tx2), \quad (1)$$

which can be expressed as:

$$d1-d2 =(t\_rx1-t\_rx2)+(t\_tx2-t\_tx1), \quad (2)$$

For the transmission delay difference d1−d2, $$d1-d2 \geq t\_rx1-t\_rx2, \quad (3)$$

since t_tx2≧t_tx1, or t_tx2−t_tx1≧0 (in the sequential order of protocol data units, protocol data unit 131' is later than protocol data unit 130'). Therefore, the time difference between the receiving moments of protocol data unit 130', received later, and protocol data unit 131', received earlier, represents the smallest possible difference between the transmission delays d1 and d2. Said time difference equals the difference between the transmission delays if protocol data units 130' and 131' are transmitted simultaneously. As equation 3 shows, there is no need to know the transmitting moments t_tx1 and t_tx2.

As can be seen from the above example, the time difference t_rx1−t_rx2 between the receiving moments indicates the smallest possible difference between the transmission delays d1 and d2 if the receiving order of the protocol data units deviates from the sequential order of the protocol data units as defined by the order indicators. In other words, the temporal order of the protocol data units has changed during transmission. The above principle can be applied to the detection of the amount of delay variation in the communications stream if there is a possibility that the temporal order of protocol data units can change during transmission and said protocol data units have a sequential order indicated to the destination network element. The principle can be applied to comparing the delay properties of sub-streams of a communications stream by selecting a first protocol data unit from a first sub-stream and a second protocol data unit from a second sub-stream. Sub-streams can be represented by protocol data units arriving at different physical or logical ingress ports, for example. In the above example, the smallest possible difference between the transmission delays was determined in a situation where the first protocol data unit belongs to a first sub-stream of a communications stream arriving at a first ingress port 107, and the second protocol data unit belongs to a second sub-stream of the same communications stream arriving at a second ingress port 106.

The above principle can also be applied in a situation where protocol data units representing a communications stream arrive at more than two ingress ports. Let us assume, for example, that a communications stream arrives at ingress ports P1, P2, ..., PN. In a situation where a protocol data unit PDU(a) arrives at ingress port Pi and protocol data unit PDU(b) arrives at ingress port Pj and the temporal order of these protocol data units PDU(a) and PDU(b) has changed, we get a quantity indicating the transmission delay difference of the transmission routes associated with said ingress ports Pi and Pj (the time difference between the receiving moments of PDU(a) and PDU(b)), where i=1 to N and j=1 to N. In other words, we get quantities indicating the transmission delay difference of the transmission routes for all ingress port pairs Pi, Pj. By examining the quantities measured for the different ingress port pairs indicating the transmission delay difference it is possible e.g. to identify the ingress port(s) whose route(s) cause(s) the most transmission delay.

The receiving moments of protocol data units can be measured using a clock signal produced by a clock generator 109. In the communications system depicted in FIG. 1 the clock generator is part of the destination network element 102. The receiving moments of protocol data units can also be measured using a clock signal received from outside the destination network element 102.

In an arrangement according to an embodiment of the invention a processor unit 108 is arranged to remove ingress port 106 from among the ingress ports available to the routing protocol in response to a situation where a protocol data unit 131', which is received earlier, is later in the sequential order, based on order indicators, than protocol data unit 130', which is received later, and an indicator value updated on the basis of the time difference between the receiving moments of the protocol data units 130' and 131' exceeds a predetermined threshold value. Route 110 thus causes bigger transmission delays than route 111. Said routing protocol may be, for example, an IP (Internet Protocol) routing protocol by means of which the source network element 101, destination network element 102, and network elements of the communications network 103 maintain their routing tables. In an arrangement according to another embodiment of the invention a processor unit 108 is arranged to downgrade the quality classification associated with ingress port 106 and used by a quality class aware routing protocol in response to a situation where a protocol data unit 131', which is received earlier, is later in the sequential order, based on order indicators, than protocol data unit 130', which is received later, and an indicator value updated on the basis of the time difference between the receiving moments of the protocol data units 130' and 131' exceeds a predetermined threshold value. In other words, the routing protocol is configured in such a way that parts or areas of the communications network 103 which cause a lot of transmission delay are replaced by other parts or areas of the communications network, and/or the quality classification of parts or areas of the communications network which cause a lot of transmission delay is downgraded in order for a quality classification aware routing protocol to be able to avoid using those parts or areas.

The procedure applied in the update of said indicator value can be chosen in several different ways. For instance, the processor unit 108 may be arranged to compare the time difference between the receiving moments to a previous indicator value and make said time difference between the receiving moments the new indicator value in response to a situation where said time difference between the receiving moments and a predetermined number (0 to N) of previously calculated corresponding time differences between the receiving times exceed said previous indicator value. For example, the processor unit 108 may be arranged to use the plain time difference between the receiving moments as said indicator value. The processor unit 108 may be arranged, for example, to use the time difference between the receiving moments as an input quantity for low-pass filtering, and an output quantity of said low-pass filtering as said indicator value.

FIG. 2 illustrates in block diagram a telecommunications system employing an arrangement according to an embodiment of the invention for determining the mutual differences of transmission delays experienced by protocol data units received. Protocol data units 230, 231, 232, 233, ... belonging to a communications stream are transmitted from a source network element 201 to a destination network element 202 via a communications network 203. Some of the protocol data units are transmitted via logical egress port 212 of the source network element 201 and some via logical egress port 213. Protocol data units transmitted through logical egress port 212 are routed onto route 210 between network elements 221 and 222 and received at logical ingress port 214 of the destination network element 202. Protocol data units transmitted through logical egress port 213 are routed onto route 211 between network elements 221 and 222 and received at logical ingress port 215 of the destination network element 202. The mutual order of protocol data units 230, 231, 232, 233, ... may change in the transmission between the network elements 221 and 222. Logical egress ports 212 and 213 are implemented in physical egress port 204 and logical ingress ports 212 and 213 are implemented in physical ingress port 207. A logical port may be represented e.g. by an IP tunnel, ATM-VC (Asynchronous Transfer Mode—Virtual Circuit), MPLS-LSP (MultiProtocol Label Switching—Label Switched Path), or some other predetermined link in the communications network. Protocol data unit 230' represents protocol data unit 230 after protocol data unit 230 has been transmitted from the source network element 201 to the destination network element 202. Similarly, protocol data unit 231' represents protocol data unit 231 after protocol data unit 231 has been transmitted from the source network element 201 to the destination network element 202.

Each protocol data unit 230, 231, 232, 233, ... is associated with an order indicator arranged to indicate the position of the protocol data unit in the mutual sequential order of said protocol data units. A given protocol data unit in the source network element is transmitted earlier than or simultaneously with the protocol data unit next in said sequential order. In the example depicted in FIG. 2, protocol data unit 231 is later than protocol data unit 230 in said sequential order.

The arrangement for determining the mutual differences of transmission delays experienced by received protocol data units employs a processor unit 208 arranged to:
- determine, based on a first order indicator associated with a first protocol data unit (230' or 231') received earlier and a second order indicator associated with a second protocol data unit (231' or 230') received later, whether the first protocol data unit is later in said sequential order than said second protocol data unit, and
- in response to a situation in which said first protocol data unit is later in said sequential order than said second protocol data unit, calculate the time difference of the receiving moments of said second protocol data unit and said first protocol data unit.

Said time difference represents the smallest possible difference between the transmission delays experienced by said second protocol data unit (231' or 230') and said first protocol data unit (230' or 231').

Figure 3:
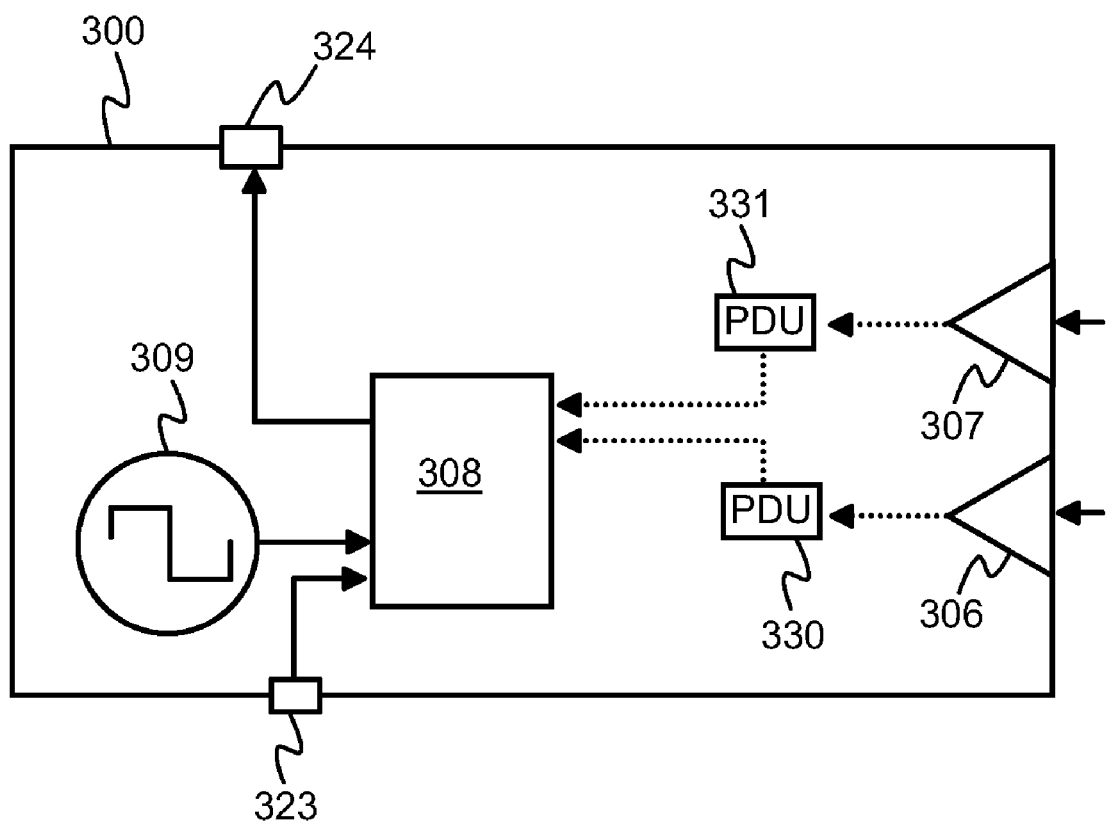
FIG. 3 illustrates in block diagram a network element according to an embodiment of the invention.

FIG. 3 is a block diagram illustrating a network element 300 according to an embodiment of the invention, which network element may be e.g. an IP router, Ethernet switch, ATM switch, base station of a mobile communications network, or an MPLS switch. The network element is adapted to receive protocol data units 330, 331. Each protocol data unit is associated with an order indicator arranged to indicate the position of the protocol data unit in the mutual sequential order of said protocol data units, and each protocol data unit is sent earlier than or simultaneously with the protocol data unit next in said sequential order. The network element has a processor unit 308 arranged to:
- determine, based on a first order indicator associated with a first protocol data unit received earlier and a second order indicator associated with a second protocol data unit received later, whether the first protocol data unit is later in said sequential order than said second protocol data unit, and
- in response to a situation in which said first protocol data unit is later in said sequential order than said second protocol data unit, calculate the time difference of the receiving moments of said second protocol data unit and said first protocol data unit, said time difference representing the smallest possible difference between the transmission delays experienced by said second protocol data unit and said first protocol data unit.

Without limiting the generality, we can assume that said first protocol data unit is protocol data unit 331 and said second protocol data unit is protocol data unit 330.

In a network element according to an embodiment of the invention said first protocol data unit is a protocol data unit received at a first ingress port 307 of said network element, and said second protocol data unit is a protocol data unit received at a second ingress port 306 of said network element. Ingress port 306 may be a physical or a logical ingress port. Similarly, ingress port 307 may be a physical or a logical ingress port.

In a network element according to an embodiment of the invention said processor unit 308 is arranged to remove ingress port 306 from among the ingress ports available to the routing protocol in response to a situation where a protocol data unit 331, which is received earlier, is later in the sequential order according to order indicators than protocol data unit 330, which is received later, and an indicator value updated on the basis of the time difference between the receiving moments of the protocol data units 330 and 331 exceeds a predetermined threshold value. As expressed in the description of FIG. 1, the procedure applied in the update of said indicator value can be chosen in several different ways.

In a network element according to an embodiment of the invention said processor unit 308 is arranged to downgrade the quality classification which is associated with ingress port 306 and used by a quality classification aware routing protocol, in response to a situation where a protocol data unit 331, which is received earlier, is later in the sequential order, which is based on order indicators, than protocol data unit 130, which is received later, and an indicator value updated on the basis of the time difference between the receiving moments of the protocol data units 330 and 331 exceeds a predetermined threshold value.

A network element according to an embodiment of the invention has a processor for executing said routing protocol. Said processor may be processor unit 308 or some other processor in the network element. A network element according to an embodiment of the invention has an egress port 324 for supplying data indicating mutual differences of transmission delays to external hardware.

A network element according to an embodiment of the invention has a clock generator 309 arranged to produce a clock signal for measuring the receiving moments of protocol data units. A network element according to an embodiment of the invention has an ingress port 323 for receiving a clock signal from outside the network element.

Figure 4:
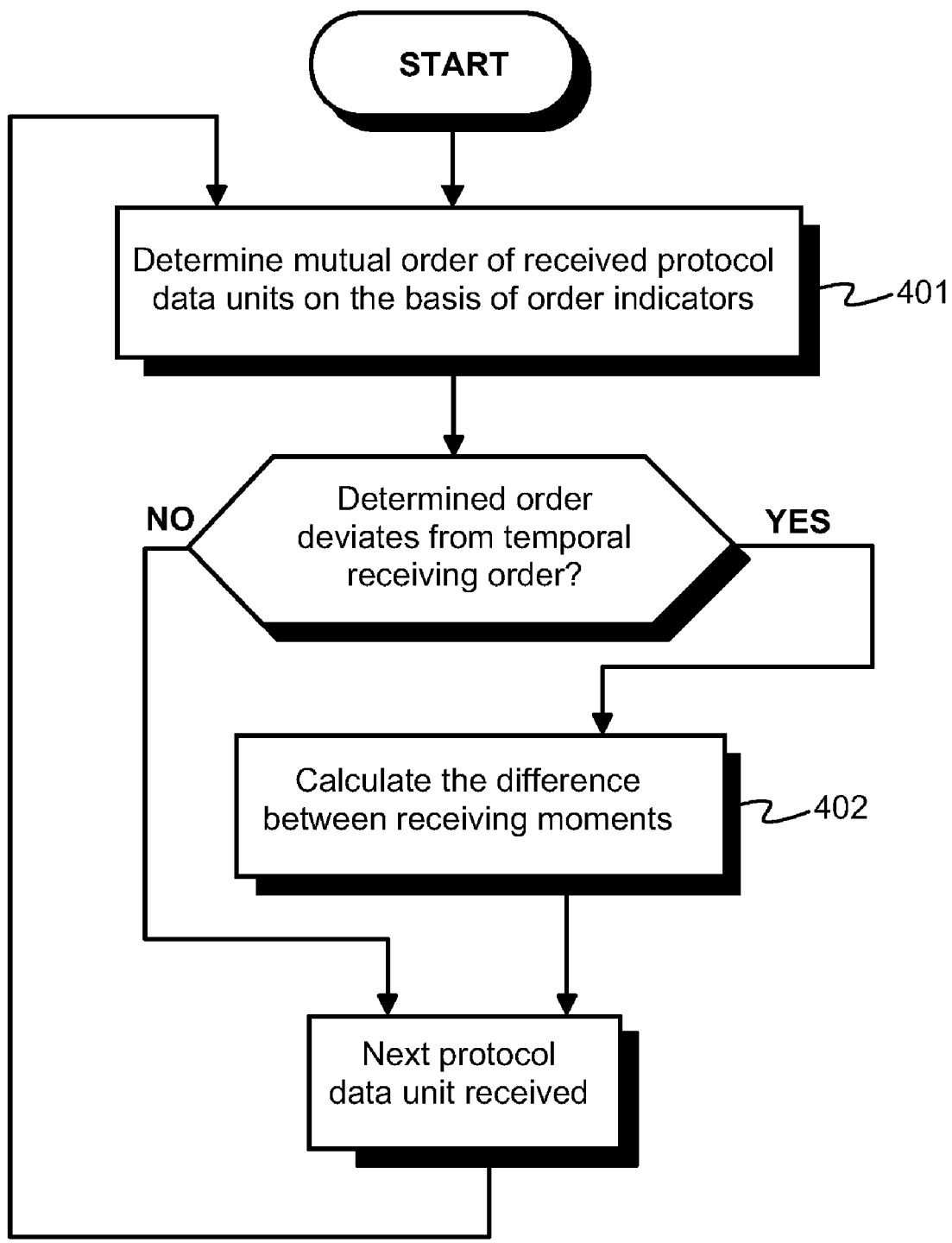
FIG. 4 illustrates in flow diagram a method according to an embodiment of the invention for determining the mutual differences of transmission delays experienced by protocol data units received.

FIG. 4 illustrates in flow diagram a method according to an embodiment of the invention for determining the mutual differences of transmission delays experienced by protocol data units received. Each protocol data unit is associated with an order indicator arranged to indicate the position of the protocol data unit in the mutual sequential order of said protocol data units, and each protocol data unit is sent earlier than or simultaneously with the protocol data unit next in said sequential order. In step 401 it is determined the mutual order of a first protocol data unit, which is received earlier, and a second protocol data unit, received later, in said sequential order, based on a first order indicator associated with said first protocol data unit and a second order indicator associated with said second protocol data unit. If said first protocol data unit is later in said sequential order than said second protocol data unit, the method proceeds to step 402 where it is calculated the time difference of the receiving moments of said second protocol data unit and said first protocol data unit. Said time difference represents the smallest possible difference between the transmission delays experienced by said second protocol data unit and said first protocol data unit.

In a method according to an embodiment of the invention said first protocol data unit is a protocol data unit received at a first ingress port of a network element, and said second protocol data unit is a protocol data unit received at a second ingress port of said network element. Said first ingress port may be a physical or a logical ingress port, and said second ingress port may be a physical or a logical ingress port.

In a method according to an embodiment of the invention, said second ingress port is removed from among the ingress ports available to the routing protocol if said first protocol data unit, received at an earlier point of time, is later in said sequential order than said second protocol data unit, received at a later point of time, and an indicator value updated on the basis of the time difference of said receiving moments exceeds a predetermined threshold value.

In a method according to an embodiment of the invention, the quality classification associated with the second ingress port and used by a quality classification aware routing protocol is downgraded if said first protocol data unit, received at an earlier point of time, is later in said sequential order than said second protocol data unit, received at a later point of time, and an indicator value updated on the basis of the time difference of said receiving moments exceeds a predetermined threshold value.

The procedure applied in the update of said indicator value can be chosen in several different ways. In a procedure according to a first example, said time difference between the receiving moments is as such used as said indicator value. In a procedure according to a second example, said time difference between the receiving moments is compared to said indicator value and if said time difference between the receiving moments and a predetermined number of time differences calculated earlier are greater than said indicator value, said time difference is set as a new indicator value. In a procedure according to a third example, said time difference between the receiving moments is used as an input quantity for low-pass filtering and an output quantity of said low-pass filtering is the indicator value.

In a method according to an embodiment of the invention, said first protocol data unit and said second protocol data unit are one of the following: IP (Internet Protocol) packets, ATM (Asynchronous Transfer Mode) cells, Ethernet units, or Frame Relay units.

In a method according to an embodiment of the invention, the order indicator associated with each protocol data unit is one of the following: transmission time stamp indicating the transmitting moment of the protocol data unit in question, and an ordinal number of the protocol data unit in question.

A computer program according to an embodiment of the invention comprises software means for controlling a programmable processor to determine the mutual differences of the transmission delays experienced by protocol data units received, wherein each protocol data unit is associated with an order indicator arranged to indicate the position of the protocol data unit in the mutual sequential order of said protocol data units, and each protocol data unit is sent earlier than or simultaneously with the protocol data unit next in said sequential order. Said software means comprises:

software means for controlling said programmable processor to determine, based on a first order indicator associated with a first protocol data unit received earlier and a second order indicator associated with a second protocol data unit received later, whether the first protocol data unit comes later in said sequential order than said second protocol data unit, and software means for controlling said programmable processor to calculate, in response to a situation in which said first protocol data unit comes later in said sequential order than said second protocol data unit, the time difference of the receiving moments of said second protocol data unit and said first protocol data unit, said time difference representing the smallest possible difference between the transmission delays experienced by said second protocol data unit and said first protocol data unit.

Said software means may be e.g. subroutines or functions. Said programmable processor may be the processor unit 308 shown in FIG. 3, for example.

A computer program according to an embodiment of the invention is stored on a storage medium, such as an optical compact disk (CD), readable by the programmable processor.

A computer program according to an embodiment of the invention is coded into a signal which can be received via a communications network such as the Internet, for example.

As is obvious to a person skilled in the art, the invention and its embodiments are not limited to the exemplary embodiments depicted above, but the invention and its embodiments can be modified within the scope of the independent claim. Expressions used in the claims describing the existence of characteristic features, such as "the arrangement has a processor unit" are non-exclusive such that a mention of a characteristic feature shall not exclude the existence of other characteristic features not mentioned in the independent or dependent claims.

What is claimed is:

1. An arrangement for determining mutual differences of transmission delays experienced by received protocol data units and for performing control actions related to ingress ports of a network element, each protocol data unit being associated with an order indicator arranged to indicate the position of that protocol data unit in a mutual sequential order of said protocol data units, and each protocol data unit being sent earlier than or simultaneously with a protocol data unit next in said sequential order, the arrangement comprising a processor unit arranged to:

determine, based on a first order indicator associated with a first protocol data unit received earlier and a second order indicator associated with a second protocol data unit received later, whether the first protocol data unit is later in said sequential order than said second protocol data unit, said first protocol data unit being a protocol data unit received at a first ingress port of the network element, and said second protocol data unit being a protocol data unit received at a second ingress port of said network element, and in response to a situation in which said first protocol data unit is later in said sequential order than said second protocol data unit, calculate a time difference of receiving moments of said second protocol data unit and said first protocol data unit, said time difference representing a lower limit for a difference between transmission delays experienced by said second protocol data unit and said first protocol data unit, wherein said processor unit is further arranged to downgrade a quality classification associated with said second ingress port and used by a quality classification aware routing protocol in response to a situation where said first protocol data unit is later in said sequential order than said second protocol data unit and an indicator value updated on the basis of said time difference exceeds a predetermined threshold value.

2. An arrangement according to claim 1, wherein said first ingress port is a physical ingress port or a logical ingress port and said second ingress port is a physical ingress port or a logical ingress port.

3. An arrangement according to claim 1, wherein said processor unit is arranged to compare said time difference with said indicator value and to set said time difference as said indicator value in response to a situation where said time difference and a predetermined number of corresponding time differences calculated earlier are greater than said indicator value.

4. An arrangement according to claim 1, wherein said processor unit is arranged to use said time difference as an input quantity for low-pass filtering, an output quantity of said low-pass filtering being said indicator value.

5. An arrangement according to claim 1, wherein said first protocol data unit and said second protocol data unit are one of the following: IP (Internet Protocol) packets, ATM (Asynchronous Transfer Mode) cells, Ethernet units, or Frame Relay units.

6. An arrangement according to claim 1, wherein said order indicator associated with each protocol data unit is one of the following: transmission time stamp indicating the transmitting moment of the protocol data unit in question, and an ordinal number of the protocol data unit in question.

7. A network element comprising:
   a first ingress port and a second ingress port for receiving protocol data units each of which is associated with an order indicator arranged to indicate the position of that protocol data unit in a mutual sequential order of said protocol data units, and each of which is sent earlier than or simultaneously with the protocol data unit next in said sequential order,
   a processor unit arranged to:
      determine, based on a first order indicator associated with a first protocol data unit received earlier and a second order indicator associated with a second protocol data unit received later, whether the first protocol data unit is later in said sequential order than said second protocol data unit, said first protocol data unit being a protocol data unit received at the first ingress port of the network element, and said second protocol data unit being a protocol data unit received at the second ingress port of the network element,
      in response to a situation in which said first protocol data unit is later in said sequential order than said second protocol data unit, calculate a time difference of receiving moments of said second protocol data unit and said first protocol data unit, said time difference representing a lower limit for a difference between transmission delays experienced by said second protocol data unit and said first protocol data unit, and
      downgrade a quality classification associated with said second ingress port and used by a quality classification aware routing protocol in response to a situation where said first protocol data unit is later in said sequential order than said second protocol data unit and an indicator value updated on the basis of said time difference exceeds a predetermined threshold value.

8. A network element according to claim 7, wherein the network element is one of the following: an IP (Internet Protocol) router, Ethernet switch, ATM (Asynchronous Transfer Mode) switch, base station of a mobile communications network, or an MPLS (Multi Protocol Label Switching) switch.

9. A method for determining mutual differences of transmission delays experienced by received protocol data units and for performing control actions related to ingress ports of a network element, each protocol data unit being associated with an order indicator arranged to indicate the position of that protocol data unit in a mutual sequential order of said protocol data units, and each protocol data unit being sent earlier than or simultaneously with the protocol data unit next in said sequential order, the method comprising:
   determining, based on a first order indicator associated with a first protocol data unit received earlier and a second order indicator associated with a second protocol data unit receiver later, whether the first protocol data unit is later in said sequential order than said second protocol data unit, said first protocol data unit being a protocol data unit received at a first ingress port of the network element and said second protocol data unit is a protocol data unit received at a second ingress port of the network element,
   in response to a situation in which said first protocol data unit is later in said sequential order than said second protocol data unit, calculating a time difference of receiving moments of said second protocol data unit and said first protocol data unit, said time difference representing a lower limit for a difference between transmission delays experienced by said second protocol data unit and said first protocol data unit, and
   downgrading a quality classification associated with said second ingress port and used by a quality classification aware routing protocol in response to a situation where said first protocol data unit is later in said sequential order than said second protocol data unit and an indicator value updated on the basis of said time difference exceeds a predetermined threshold value.

10. A method according to claim 9, wherein said first ingress port is a physical ingress port or a logical ingress port and said second ingress port is a physical ingress port or a logical ingress port.

11. A method according to claim 9, wherein said time difference is compared to said indicator value and if said time difference and a predetermined number of corresponding time differences calculated earlier are greater than said indicator value, said time difference is set as a new indicator value.

12. A method according to claim 9, wherein said time difference is used as an input quantity for low-pass filtering, an output quantity of said low-pass filtering being said indicator value.

13. A method according to claim 9, wherein said first protocol data unit and said second protocol data unit are one of the following: IP (Internet Protocol) packets, ATM (Asynchronous Transfer Mode) cells, Ethernet units, or Frame Relay units.

14. A method according to claim 9, wherein said order indicator associated with each protocol data unit is one of the following: transmission time stamp indicating the transmitting moment of the protocol data unit in question, and an ordinal number of the protocol data unit in question.

15. A non-transitory computer readable medium encoded with a computer program for controlling a programmable processor to determine mutual differences of transmission delays experienced by protocol data units received and to perform control actions related to ingress ports of a network element, each protocol data unit being associated with an order indicator arranged to indicate the position of that protocol data unit in a mutual sequential order of said protocol data units, and each protocol data unit being sent earlier than or simultaneously with the protocol data unit next in said sequential order, the computer program comprising:
   software means for controlling said programmable processor to determine, based on a first order indicator associated with a first protocol data unit received earlier and a second order indicator associated with a second protocol data unit received later, whether the first protocol data unit is later in said sequential order than said second protocol data unit, said first protocol data unit being a protocol data unit received at a first ingress port of the network element to be controlled, and said second protocol data unit being a protocol data unit received at a second ingress port of the network element,
   software means for controlling said programmable processor to calculate, in response to a situation in which said first protocol data unit is later in said sequential order than said second protocol data unit, a time difference of receiving moments of said second protocol data unit and said first protocol data unit, said time difference representing a lower limit for a difference between the transmission delays experienced by said second protocol data unit and said first protocol data unit, and
   software means for controlling said programmable processor to downgrade a quality classification associated with said second ingress port and used by a quality classification aware routing protocol in response to a situation where said first protocol data unit is later in said sequential order than said second protocol data unit and an indicator value updated on the basis of said time difference exceeds a predetermined threshold value.

* * * * *